United States Patent [19]

Umeda

[11] 4,091,426
[45] May 23, 1978

[54] DEVICE FOR DETECTING AN END OF A CASSETTE TAPE

[75] Inventor: Hiroyuki Umeda, Yokohama, Japan

[73] Assignee: Victor Company of Japan, Limited, Yokohama, Japan

[21] Appl. No.: 750,220

[22] Filed: Dec. 13, 1976

[30] Foreign Application Priority Data

Dec. 13, 1975 Japan .................................. 50-168236
Jun. 11, 1976 Japan .................................. 51-74969

[51] Int. Cl.² ........................................... G11B 15/00
[52] U.S. Cl. ....................................... 360/74; 360/132; 242/188
[58] Field of Search ................... 360/74, 132; 242/188

[56] References Cited

U.S. PATENT DOCUMENTS

| 3,596,006 | 7/1971 | Lawhon | 360/132 |
| 3,861,619 | 1/1975 | Wolff | 242/188 |
| 3,962,727 | 6/1976 | Kamimura et al. | 360/132 X |

FOREIGN PATENT DOCUMENTS

| 2,139,686 | 12/1973 | France. | |
| 1,254,377 | 11/1967 | Germany | 242/188 |
| 2,341,669 | 2/1975 | Germany | 242/188 |

Primary Examiner—John J. Wolff

[57] ABSTRACT

A device detects an end of a tape in a tape cassette. The tape cassette comprises a first reel having an opaque tape wound thereon, with one end of the tape connected to a transparent first leader which is fixed at its other end to the hub of the reel. A second reel receives the tape as it is wound. This tape is connected to one end of a second transparent leader which is fixed at its other end to the second reel hub. A cassette containing the reels has first and second windows in at least one side wall. The tape end detection device comprises at least one light-emitting element and first and second light-receiving elements respectively disposed on opposite sides of the tape, relative to the first and second windows. The light-receiving elements detect the tape ends in resonse to their reception of light passing through the windows.

2 Claims, 8 Drawing Figures

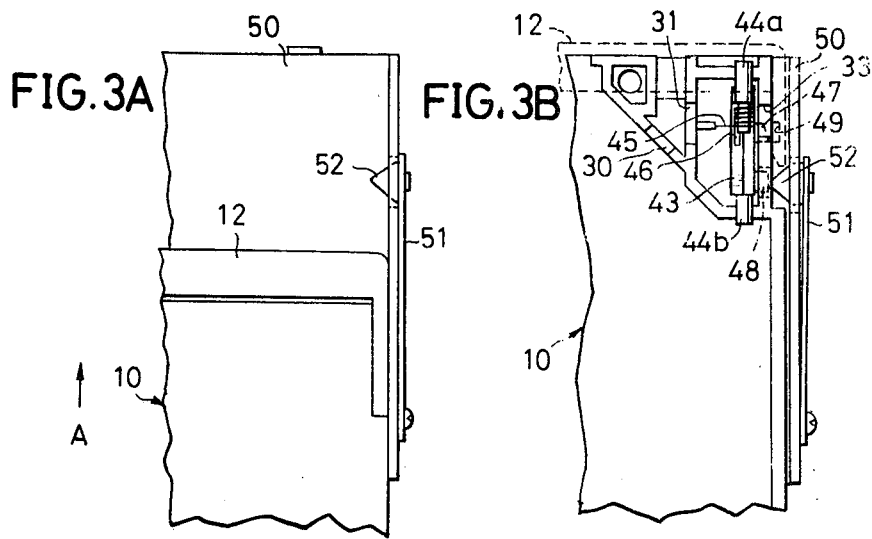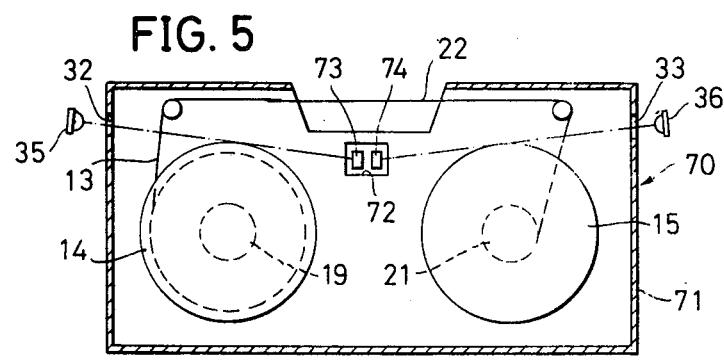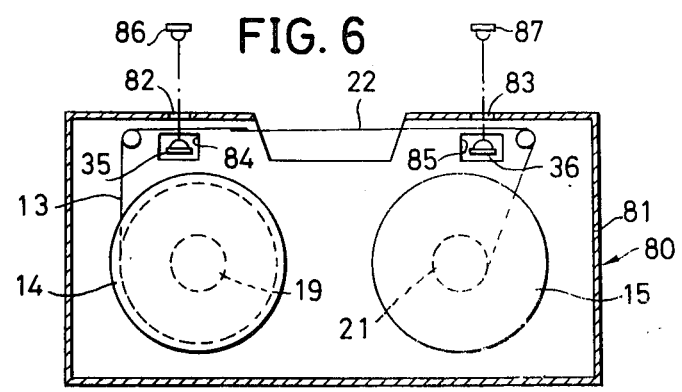

DEVICE FOR DETECTING AN END OF A CASSETTE TAPE

BACKGROUND OF THE INVENTION

The present invention relates generally to a device for detecting the ends of a cassette tape and more particularly to a device for detecting a tape-end when the entire tape has been wound on a takeup reel or when the tape on the supply reel cannot travel further.

Tape-end detection devices known heretofore have detected the completely wound state of a tape. For example, a device in each reel hub is formed from a transparent material adapted to hold a photocell. The tape end detection depends upon whether or not light is received from a lamp positioned within the cassette. However, the cassette construction becomes complicated since the photocell is mounted on the side of the recording and/or reproducing apparatus and is fitted relatively into the cassette. Moreover, since light must be detected after it has been transmitted through a relatively thick reel hub, it is inaccurate and unreliable.

In another known tape-end device, a photocell is disposed outside of the reel. The light from a lamp is shut off by the tape roll wound upon the reel hub. When the tape has been completely unwound and paid out, the light from the lamp reaches the photocell. However, since a tape is very thin, there is difficulty of positively detecting whether or not the tape has been wound around the reel hub.

SUMMARY OF THE INVENTION

Accordingly, it is a general object of the present invention to provide a novel and useful device for detecting the end of a cassette tape, which overcomes the above described difficulties.

Another and specific object of the invention is to provide a tape end detection device for use in cassettes to positively detect a tape end when a tape is completely wound around a takeup reel or a supply reel and to indicate whether it is on the supply reel or the takeup reel.

Still another object of the invention is to provide a device which detects tape ends of a cassette tape by detecting light transmitted through transparent leader tapes.

A further object of the invention is to provide a tape-end detection device for cassette tapes. Here an object is to detect when a cassette is loaded into a recording and/or reproducing apparatus.

Further objects and features of the invention will be apparent from the following detailed description with respect to preferred embodiments of the invention when read in conjunction with the accompanying drawings, briefly described below.

BRIEF DESCRIPTION OF THE DRAWINGS

In the drawings:

FIGS. 3A and 3B are fragmentary plan views respectively showing the manner in which the cover of the tape cassette is locked and unlocked;

FIG. 5 is a plan view showing a second embodiment of the detection device with a tape cassette, which is shown with its upper half cut away; and FIG. 6 is a plan view showing a third embodiment of the detection device with a tape cassette, which is shown with its upper half cut away.

DETAILED DESCRIPTION

Figure 1:
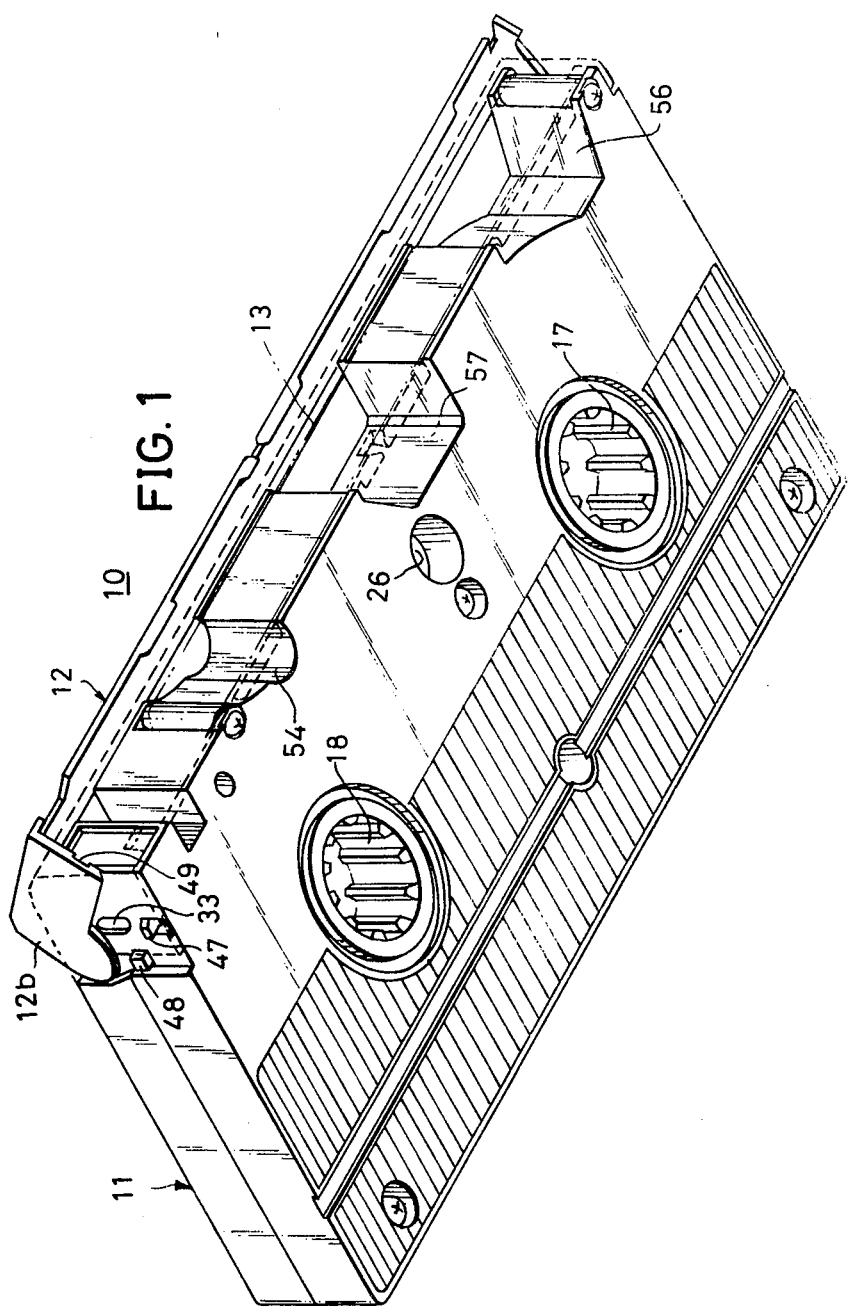
FIG. 1 is a perspective view of the bottom of one embodiment of a tape cassette which cooperates with the detection device of the invention.
Figure 2:
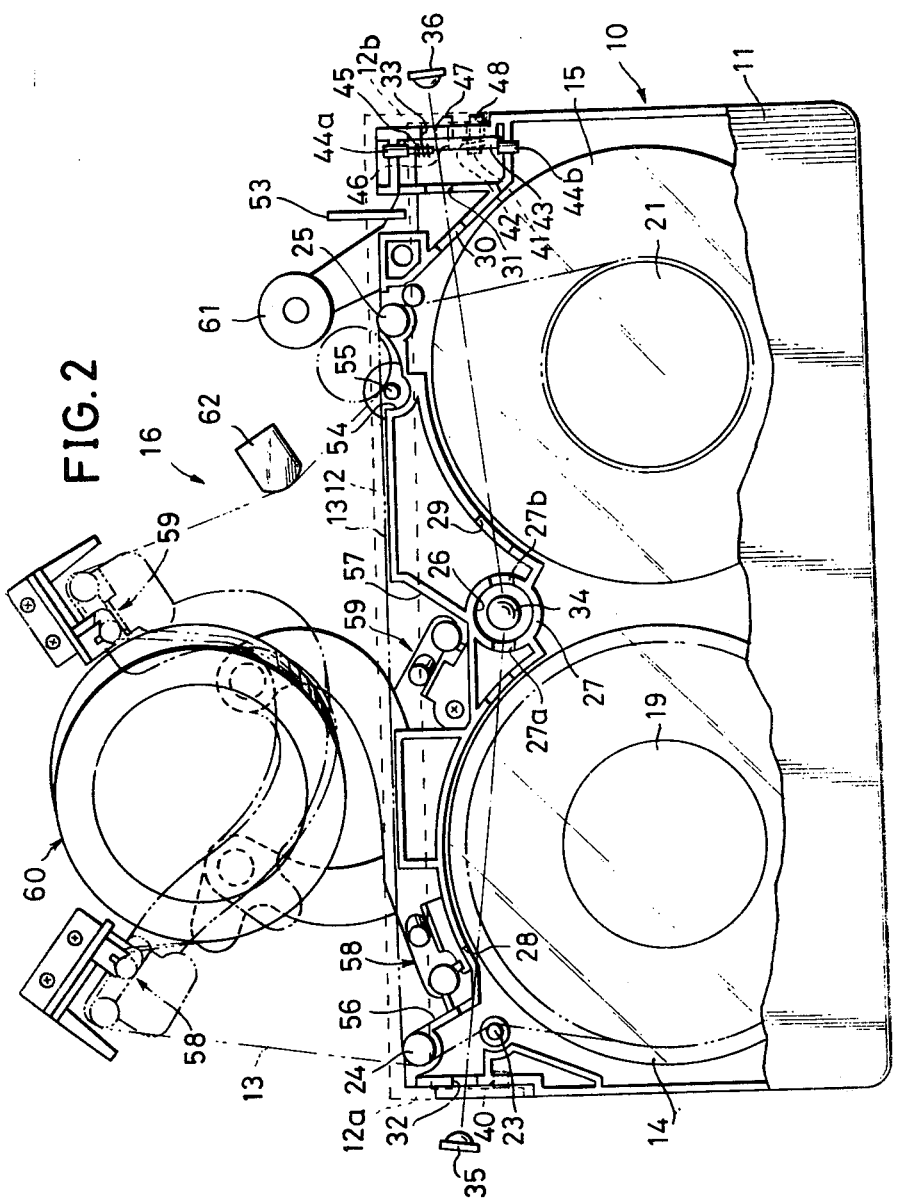
FIG. 2 is a plan view showing a first embodiment of the detection device with a tape cassette, shown with its upper half cut away.

One embodiment of a tape cassette for detecting an end of a tape has a construction as shown in FIGS. 1 and 2. The tape cassette 10 has an outer housing structure comprising a cassette case 11 and a lid 12. The lid is freely openable and closable on the front face of the case 11. The cassette case 11 accommodates therewithin, a freely rotatable tape supply reel 14 and a tape takeup reel 15 each for winding an opaque magnetic tape 13. The bottom of cassette case 11 has two shaft holes 17 and 18 for receiving reel drive spindles or shafts on the recording and/or reproducing apparatus 16. These shafts fit into the hubs of the respective reels 14 and 15 when the cassette 10 is inserted into its loaded position in the recording and/or reproducing apparatus.

Figure 4A:
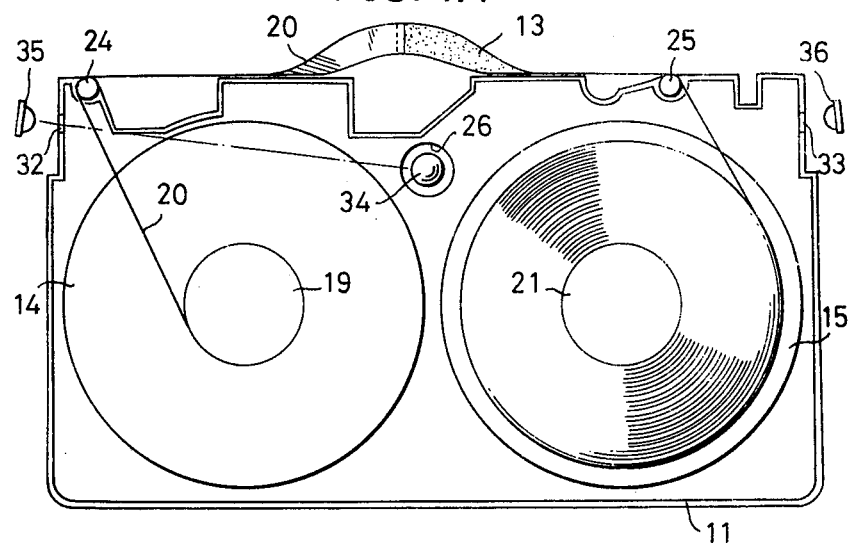
FIGS. 4A and 4B are plan views of a tape cassette, with the upper half of its case removed, respectively showing the tape end upon completion of the fast-forward and rewind modes of operation.
Figure 4B:
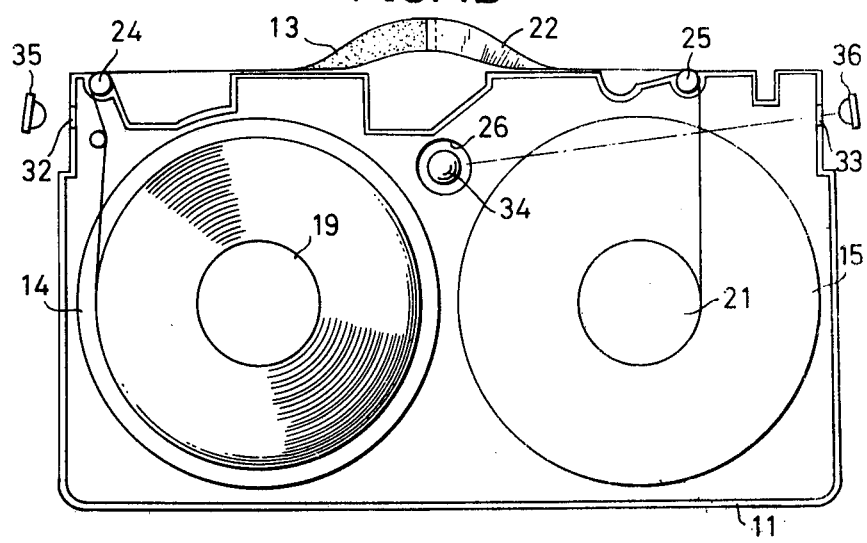

As shown in FIGS. 4A and 4B, one end of the magnetic tape 13 is connected to the outer end of a transparent leader 20 which is fixed at its inner end to the hub 19 of the supply reel 14. The other end of the magnetic tape 13 is connected to the outer end of a transparent leader 22 which is fixed at its inner end to hub 21 of the takeup reel 15. The magnetic tape 13 is guided by guide poles 23, 24, and 25 from the supply reel 14 to the takeup reel 15 during normal recording, reproducing, or fast-forwarding mode operations, and from the takeup reel 15 to the supply reel 14 during rewinding.

Within the cassette case 11, a hole 26 receives a lamp and constitutes an opening at a position between the two reels 14 and 15 and near the front face side of the case. This lamp fitting hole 26 is defined and bordered by a cylindrical wall 27, in which openings 27a and 27b are formed. Furthermore, at specific positions in the wall structures within the case 11, cutouts or openings 28, 29, 30, and 31 are formed. In addition, windows 32 and 33 are provided in the two side walls of the case 11.

In the recording and/or reproducing apparatus 16, a light-emitting element, e.g., a lamp 34, fits into the hole 26 when the tape cassette 10 is inserted into its loading position. In the recording and/or reproducing apparatus 16, a light receiving element, e.g., a photocell 35, is positioned to receive light emitted by the lamp 34 which passes through the openings 27a and 28 and the window 32. In addition, a photocell 36 receives the light emitted by the lamp 34 which passes through the openings 27b, 29, 30, and 31 and the window 33.

The lid 12 is hinged by pivot pins 40 and 41 at the front face side of the case 11 and is continually urged to swing toward a closed position by a torsion spring 42 around the pivot pin 41. When the cassette 10 is not loaded in apparatus 16, the lid 12 is closed, as indicated by broken lines in FIG. 1, to cover the magnetic tape 13 which is exposed at the front face of the cassette case 11. When the lid 12 is closed, the windows 32 and 33 are covered by the side parts 12a and 12b of the lid 12, to prevent infiltration of dust.

Within the case 11, a lock plate 43 is rotatably supported by pivot pins 44a and 44b and urged by a torsion spring 45 to press against the inner surface of the case side wall. The lock plate 43 has an opening 46. Projections 47 and 48 on the side surface of the lock plate 43 project through openings in the side wall of the case. The projection 47 engages a recess 49 in the lid 12, when it is closed, thereby locking the lid 12 against opening. The projection 48 is disposed within a groove formed between the side wall of the lid 12 and the outermost surface of the case 11 when the lid 12 is closed.

The tape cassette 10, with its lid 12 closed, is inserted horizontally in the arrow direction A onto and along a loading platform 50 of the recording and/or reproducing apparatus 16, as indicated in FIG. 3A. A leaf spring 51 has a projection 52 at its free end and is fixed at its root end to the side of the loading platform 50. As the cassette 10 is inserted, the projection 52 slides along the side wall of the lid 12. When the cassette 10 is fully inserted as shown in FIG. 3B, the projection 52 fits into the groove between the lid 12 and the outermost surface of the case 11 and presses the projection 48 toward the left, as viewed in the same figures. As a consequence, the lock plate 43 rotates, overcoming the force of the spring 45. The projection 47 is also displaced leftward and is disengaged from the recess 49 of the lid 12, thereby unlocking the lid 12.

Then, when the loading platform 50 is thereafter lowered, the lower edge of the lid 12 presses against a lug 53 fixed to the recording and/or reproducing apparatus 16. Together with the downward movement of the cassette 10, the lid 12 engages the lug 53 and opens against the force of the spring 42, as indicated by full lines in FIG. 1. Consequently, the front of the magnetic tape 13 is revealed, and the window 33 opens.

On the downward movement of the cassette 10, the lamp 34 is fitted into the hole 26, and the reel drive shafts (not shown) are fitted into shaft holes 17 and 18. At the same time, a capstan 55 fits into a recess 54 on the front side of the case 11. Tape drawing out and loading members 58 and 59 fit into recesses 56 and 57.

When the recording and/or reproducing apparatus is placed in the recording or reproducing mode of operation, the upper drum of a guide drum 60 having video heads begins to rotate. At the same time, the tape drawing out and loading members 58 and 59 move to the positions indicated by broken lines. The magnetic tape 13 wraps around part of the guide drum 60. A pinch roller 61 presses the magnetic tape 13 against the capstan 55.

The magnetic tape 13 thus clamped by the capstan 55 and the pinch roller 61 is driven by the rotation thereof. The tape on the supply reel 14 is unwound and paid out to be wound up on the takeup reel 15. At the same time, video signals are recorded on or reproduced from the magnetic tape 13 by video heads of the guide drum 60. An audio signal is recorded or reproduced by an audio head 62.

During the recording or reproducing, the light from the lamp 34 is shut off by the magnetic tape 13 paid out or supplied from the supply reel 14 and wound or taken up by the takeup reel 15. Thus, light does not reach the photocells 35 and 36.

When the magnetic tape 13 has been completely paid out from the supply reel 14, and the recording or reproducing has been completed, the transparent leader 20 is paid out into the tape travel path between the reel hub 19 and the guide pole 24. Consequently, the light from the lamp 34, which until now has been shut off by the opaque magnetic tape 13, passes through the leader 20 and the window 32, reaching the photocell 35. This reception of the light by the photocell 35 means the detection of the end of the tape. The resulting output detection signal of the photocell 35 stops the recording or reproducing operation.

The fast forwarding mode operation is carried out with the tape 13 accommodated within the case 11. Upon completion of this fast forwarding mode operation, as indicated in FIG. 4A, the light from the lamp 34 passes through the leader 20 and the window 32 and is received by the photocell 35. The fast forwarding mode of operation is thus stopped. The length of the leader 20 is adequate to cut across the path of the light from the lamp 34 to the photocell 35, but it does not reach a position which cuts across the path of the light from the lamp 34 to the photocell 36.

The rewinding of the magnetic tape 13 is also carried out with the tape accommodated within the case 11. As shown in FIG. 4B, upon completion of the rewinding operation, the transparent leader 22 is paid out into the tape travel path between the reel hub 21 and the guide pole 25. As a consequence, the light from the lamp 34, which until now has been shut off by the opaque magnetic tape 13, passes through the leader 22, the openings 30, 31, and 46, and the window 33 and reaches the photocell 36. This reception of the light by the photocell 36 means the detection of the end of the tape which has completed its rewinding. The resulting ouput detection signal of the photocell 36 stops the rewinding operation. The leader 22 is long enough to cut across the path of the lamp 34 to the photocell 36, but not to cut across the light path of the lamp 34 to the photocell 35. In FIGS. 4A and 4B, parts of the magnetic tape 13 and the leaders 20 and 22 are shown twisted, but only for explanation purpose.

A second embodiment of the invention and a tape cassette are illustrated in FIG. 5. The cassette is shown with its upper half removed. In FIG. 5, those parts which are the same as corresponding parts in FIGS. 2, 4A, and 4B are designated by like reference numerals. The description of these parts will not be repeated.

In the second embodiment, a hole 72 is provided in the bottom of the case 71 of the cassette 70. As the cassette 70 is inserted into the recording and/or reproducing apparatus, two light-emitting elements 73 and 74 are fitted into the hole 72. The light-emitting element 73 emits light toward the photocell 35, while the light-emitting element 74 emits light toward the photocell 36. With this arrangement, the tape-end detection operation is exactly the same as that of the above described preceding embodiment of the invention.

The instant embodiment of the invention is best suited for light-emitting elements 73 and 74, such as a luminous diode which has only one light-emitting face.

In the instant embodiment, the positions of the photocells 35 and 36 may be respectively interchanged with those of the light-emitting elements 73 and 74. More specifically, the photocells 35 and 36 may be installed in place of the light-emitting elements 73 and 74 in the hole 72. The light-emitting elements 73 and 74 may be installed in place of the photocells 35 and 36 above the two sides of the cassette 70. In this case, the photocells within the cassette receive light from the light-emitting elements outside of the cassette.

FIG. 6 shows a third embodiment of the invention together with a tape cassette, the cassette being shown with its upper half removed. In FIG. 6, those parts which are the same as corresponding parts in FIGS. 2, 4A, and 4B are designated by like reference numerals. A description of such parts will not be repeated.

In the instant embodiment, windows 82 and 83 are provided in the front side wall of the case 81 of the cassette 80. Two holes 84 and 85 are provided in the bottom of the case. As the cassette 80 is inserted into its loading position in the recording and/or reproducing apparatus, the photocells 35 and 36 respectively fit into the holes 84 and 85. In the recording and/or reproducing apparatus, light-emitting elements 86 and 87 are respectively provided at positions confronting the photocells 35 and 36.

When the transparent leader 20 reaches a position where it cuts across the light path from the light-emitting element 86 to the photocell 35, the photocell 35 receives light and thus detects the tape end. When the transparent leader 22 reaches a position where it cuts across the light path from the light-emitting element 87 to the photocell 36, the photocell 36 receives light and thus detects the tape end.

In this embodiment of the invention, the positions of the photocells 35 and 36 and the light-emitting elements 86 and 87 may be interchanged.

In each of the above described embodiments of the invention, the light-emitting elements are not limited to lamps but may take other forms that emit light. Furthermore, the light-receiving elements are not limited to photocells, but may be other elements which receive light and convert it into electric signals.

The tape-end detection signal can be used not only as a signal for stopping the recording and/or reproducing apparatus but also for changing the operational mode thereof, such as from the recording or reproducing mode to the rewinding mode or from the rewinding mode to the recording or reproducing mode.

Further, this invention is not limited to these embodiments. Variations and modifications may be made without departing from the scope and spirit of the invention.

What is claimed is:

1. A device for detecting the ends of a tape in a tape cassette, said tape cassette comprising a first reel having a first hub and a second reel having a second hub, an opaque tape having first and second transparent leaders integrally fixed to the opposite ends thereof, said tape being connected at the opposite ends of said leaders to said first and second hubs, cassette case means for receiving and accommodating said first and second reels, said case having a front face terminated at opposite ends by spaced side walls respectively having first and second windows formed therein, a part of said tape being exposed through said first and second windows on the opposite side walls thereof respectively, and lid means hinged on said cassette to swing between a closed position where said lid means covers said front face and said first and second windows and an opened position where said lid means exposes said front face and said first and second windows; detector means within the cassette case comprising one light-emitting means, first and second light-receiving means respectively disposed opposite said light-emitting means and said first and second windows when said lid means is in the opened position, means comprising said first light-receiving means for detecting one end of the tape in response to light passing through said first leader and said first window when said lid means is in the opened position, and means comprising said second light-receiving means for detecting the other end of the tape in response to light passing through said second leader and said second window when said lid means is in the opened position, and the length of the leaders being such that the first leader reaches a position which cuts across a light path extending from said light-emitting means to said first light-receiving means but does not reach a position which cuts across a light path extending from said light-emitting means to said second light-receiving means, and the length of the second leader reaches a position which cuts across the light path extending from said light-emitting means to said second light-receiving means but does not reach a position which cuts across the light path extending from said light-emitting means to said first light-receiving means, whereby the light receiving means illuminated by the light path is indicative of the direction of tape travel.

2. A detection device as claimed in claim 1 and a recording or reproducing apparatus having means for recording signals on or reproducing said signals from said tape, means in said cassette for locking said lid means in the closed position, unlocking means operating in response to an insertion of said cassette into a loading position, means operating in response to the insertion of said cassette into said loading position for opening the unlocked lid, hole means provided in said cassette for receiving said light-emitting means in response to the insertion of said cassette into said loading position, and means for drawing out the tape exposed by opening said lid means and loading the tape in a path along said recording or reproducing apparatus.

* * * * *